(12) United States Patent
Bullinger et al.

(10) Patent No.: US 6,848,717 B2
(45) Date of Patent: Feb. 1, 2005

(54) BELT TENSIONER

(75) Inventors: Wilfried Bullinger, Korntal-Muenchingen (DE); Walter Eberle, Hochdorf (DE); Christian Mayer, Ditzingen (DE); Markus Woldrich, Ditzingen (DE); Kai Wustlich, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 10 days.

(21) Appl. No.: 10/358,971

(22) Filed: Feb. 5, 2003

(65) Prior Publication Data
US 2003/0224887 A1 Dec. 4, 2003

(30) Foreign Application Priority Data

Feb. 5, 2002 (DE) .......................................... 102 04 475

(51) Int. Cl.⁷ ............................................... B60R 22/46
(52) U.S. Cl. .................... 280/806; 242/390.9; 297/477
(58) Field of Search ................................ 280/806, 807; 242/372, 374, 375, 375.1, 390.8, 390.9; 297/475, 476, 477, 478

(56) References Cited

U.S. PATENT DOCUMENTS

| | | | | | |
|---|---|---|---|---|---|
| 3,845,836 | A | * | 11/1974 | Bendler et al. | 297/480 |
| 4,592,520 | A | * | 6/1986 | Kawaguchi | 242/372 |
| 4,907,757 | A | * | 3/1990 | Rumpf et al. | 242/385.4 |
| 5,788,281 | A | * | 8/1998 | Yanagi et al. | 280/806 |
| 6,332,629 | B1 | * | 12/2001 | Midorikawa et al. | 280/806 |
| 6,427,935 | B1 | * | 8/2002 | Fujii et al. | 242/390.9 |

FOREIGN PATENT DOCUMENTS

DE   299 08 959   11/1999

* cited by examiner

Primary Examiner—David R. Dunn
(74) Attorney, Agent, or Firm—Kenyon & Kenyon

(57) ABSTRACT

In a belt tensioner of a seat belt in a vehicle, particularly a motor vehicle, for the return movement of the belt, a return spring is provided which is able to be tensioned by a motor as a function of parameters. The motor may also be used for a reversible tightening of the belt.

12 Claims, 3 Drawing Sheets

BELT TENSIONER

CROSS-REFERENCE TO RELATED APPLICATION

The present application claims priority from Application No. 102 04 475.9, filed in the Federal Republic of Germany on Feb. 5, 2002, which is expressly incorporated herein in its entirety by reference thereto.

FIELD OF THE INVENTION

The present invention relates to a belt tensioner of a seat belt for an occupant on a seat in a vehicle, e.g., a motor vehicle. The belt tensioner may include:

a retraction device, activated by a return spring, for automatically shortening the belt;

effective extraction lock of the belt in response to predetermined parameters, in particular predetermined deceleration or acceleration of the vehicle or its body and/or exceeding a predetermined extraction speed of the belt;

an irreversible tensioning device, which irreversibly tightens the belt with a powerful force, e.g., 4000 N, for a short period of time, e.g., 10 to 15 ms, in response to receiving a crash signal that can be generated by a sensory system, e.g., a signal for triggering an airbag;

the return spring including a retainer that is remote from the belt and is adjustable by motor according to predefined parameters; and the retainer coupleable or connectable to the retraction device by a normally open clutch or coupling parallel to the return spring, in order to connect the retraction device directly to the motor for a reversible belt tightening in response to dangerous driving conditions.

BACKGROUND INFORMATION

In such belt tensioners standardly used in motor vehicles at present, the retraction device is actuated by a spiral spring, which has a design-based initial tension when the belt is retracted, and is increasingly tensioned according to its spring characteristic as the belt is pulled out.

The extraction lock operates with mechanical catch members. On one hand, these are controlled by inertia members, which are displaced from a position ineffective for the catch bolt to a position effective for the catch bolt, when forces acting on the vehicle body produce a body acceleration or deceleration exceeding a low threshold value. On the other hand, centrifugal members are deflected from a position ineffective for the catch bolt to a position effective for the catch bolt when a reel used for receiving the belt is rotated in the extraction direction of the belt at an angular acceleration exceeding a threshold value or in a jerky manner. This ensures that the belt is reliably restrained from being pulled out (further) in driving situations tending to be dangerous, or even in crashes.

In view of the fact that drivers and/or, in particular, passengers of a vehicle may at least temporarily assume a position outside of the normal or desired sitting position, the belt tensioners, at least those in higher-quality vehicles, are assigned irreversible tensioning devices, which typically function in a pyrotechnical manner and are triggered when a corresponding sensory system "reports" a collision of the vehicle or triggers an airbag present in the vehicle. These irreversible belt tensioners are used to shorten the seat belt with great force. In this manner, any slack in the belt against the body of the occupant, as well as at or on the reel of the belt, is eliminated, and optimal safety for the respective occupant from possible secondary collisions is also ensured after a previously triggered airbag relaxes. In any case, the occupant is kept away as much as possible from hard structural members of the vehicle body.

The irreversible tensioning device may be positioned at a limit stop of the belt, on the seat-belt buckle, or on the belt retractor.

To improve comfort, German Published Patent Application No. 39 38 081 describes assigning an electric motor to the spring provided for actuating the retraction device, in order to adjust the relatively stationary retainer of the return spring. In this manner, the belt tension may be changed, and in particular, the tension of the belt remains low and the wear comfort is improved accordingly, even when the belt is pulled out very far, as is necessary in the case of above-average height or corpulence of the occupant. As soon as the belt is retracted for winding it up, the relatively stationary retainer is returned by the above-mentioned motor to a starting position, so that the belt may be wound up reliably.

Similar arrangements are the subject matter of German Published Patent Application Nos. 41 12 620 and 195 01 076.

In German Published Patent Application No. 100 13 870, it is described to reversibly increase the belt tension when a sensory system signals a dangerous driving condition. This prepares the belt for a possible crash of the vehicle.

It is an object of the present invention to improve the tightening of the belt from the aspects of both safety and comfort.

SUMMARY

The above and other beneficial objects of the present invention may be achieved by providing a belt tensioner as described herein.

This object may be achieved according to the present invention for a belt tensioner, in that the motor is switchable between two power ranges, and the clutch or coupling is able to be closed by the motor when, i.e., in that the motor operates in its direction of rotation provided for the reversible belt tightening or switches to high power.

The present invention is based on the concept, to make a reversible belt tightening possible solely due to the fact that the motor is switched to high power and direction of rotation for belt tightening, in which the retraction device is driven by the motor directly for reversible tightening of the belt, and a possibly existing belt slack is completely retracted, with effective tightening of the belt, before a crash may occur due to a dangerous situation.

Thus, the reversible belt tightening provided according to the present invention is able, on one hand, to ensure markedly increased safety. The irreversible tensioning device may still be able to pull the occupant into the desired sitting position.

On the other hand, the motor provided for the reversible tightening, due to its drive-type connection to the belt-remote retainer of the return spring, offers the possibility of ensuring particularly great comfort during normal driving situations, in that the motor adjusts the belt-remote retainer along the lines of reducing the tension of the return spring, so that the occupant virtually does not notice the belt. In response to possible movements of the occupant, the belt-remote retainer of the return spring may be adjusted temporarily along the lines of increasing the spring energy, in order to improve the belt retraction which may be necessary.

The belt-remote retainer of the return spring may also be adjusted along the lines of increasing the spring tension when the belt is released from the belt buckle or remains unused. Thus, the belt may be speedily shortened into its disused state or held in this state by intensified spring energy.

Thus, the motor provided for adjusting the spring retainer has a multiple function, in that on one hand, it may improve the wear comfort and facilitate use of the belt, and on the other hand, in response to a dangerous situation, it may immediately set a sharply increased belt tension to "prepare" the belt system for a possible accident.

According to an example embodiment of the present invention, the clutch parallel to the return spring is arranged as a gradient clutch which closes automatically when the motor-related clutch input, i.e., the clutch input allocated to the spring retainer adjustable by the motor, is moved with a speed exceeding a threshold value. This closed state is maintained as long as a force or torque is transmitted, i.e., the clutch may only open when the force transmission or torque transmission disappears, or the force or torque direction reverses.

In this manner, simple arrangements may reliably ensure that the clutch closes in response to switching on the high power stage of the retraction motor and is able to open in response to the switchover to the low power stage.

The gradient clutch may be constructed as a roller freewheel, the clamping rollers of which are held in a position ineffective for clamping by a latchable roller cage. As soon as the motor switches over to the high power stage and strongly accelerates the clutch input accordingly, the latching effective between the clutch input and the clamping roller cage is canceled, and the clutch closes.

If desired, a centrifugal clutch may also be provided.

Regarding features of the present invention, reference is made to the following explanation of the drawings, on the basis of which an example embodiment of the present invention is described in detail.

DETAILED DESCRIPTION

Figure 1:
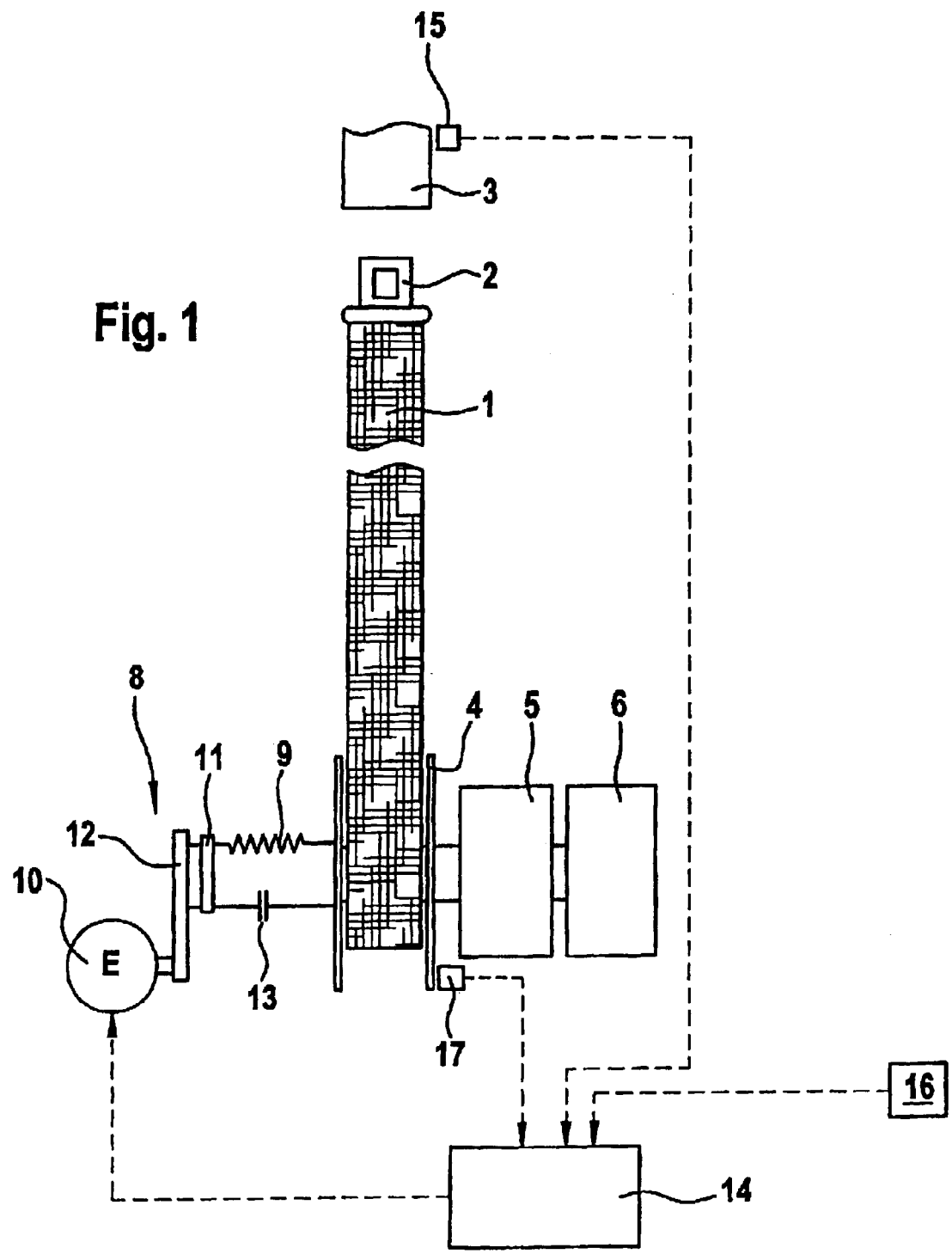
FIG. 1 is a schematic view of a belt tensioner system according to the present invention.

As illustrated in FIG. 1, a seat belt 1 has a buckle latch 2 which is attached to it and may be inserted into a belt buckle 3 or separated from belt buckle 3 in a conventional manner. Seat belt 1 is rolled up on a reel 4 in such a manner that in each instance, seat belt 1 has the desired or required length. This is described below in further detail.

Reel 4 is assigned a mechanical extraction lock 5 in a conventional manner, which blocks reel 4 from rotating in the unwinding direction of seat belt 1 when the rotational speed of reel 4 and/or the acceleration or deceleration of the vehicle in which seat belt 1 is mounted exceeds a threshold value.

In addition, reel 4 may be assigned an irreversible tensioning device 6, which functions in a pyrotechnical manner and is triggered when a vehicle sensory system detects a collision or a directly imminent collision of the vehicle. In this case, tensioning device 6 irreversibly tightens the belt, using a very strong force, e.g., 4000 N. In this manner, the occupant safeguarded by seat belt 1 may be especially protected from collisions with interior body fittings of the vehicle.

In addition, parallel to extraction lock 5, reel 4 is equipped with a retraction device 8, to be able to roll up seat belt 1 when not in use or shorten it when the occupant has pulled the belt out because of a bodily movement and moves back again into his/her desired sitting position.

For this purpose, retraction device 8 has a return spring 9 formed as a spiral spring, as further described below. Return spring 9 has a belt-remote retainer 11 that is adjustable by motor, particularly electric motor 10, and that is connected via a toothed belt 12 to electric motor 10 in a manner allowing it to be driven.

Parallel to return spring 9, a clutch 13 is positioned between retainer 11, and belt reel 4 and a shaft joined in a rotatably fixed manner thereto, clutch 13 normally being open and closing automatically when the electric motor is switched to a high power stage and rotates according to the winding-up direction of belt reel 4.

A control circuit 14, which is connected on the incoming side to a sensory system for different operating parameters, is used to control the power output of electric motor 10.

This sensory system may have a buckle-side sensor 15, the signal of which indicates whether or not buckle latch 2 is inserted into belt buckle 3.

In addition, a sensor arrangement 16 is provided, which allows for the detection of driving situations that are dangerous or tend to be dangerous. For example, sensor arrangement 16 may detect the operation of the accelerator and brake pedal, the response of a brake-assist device, as well as the fluid pressure in the brake system, and therefore the actuation state of the vehicle brake. In addition, or as an alternative, sensor arrangement 16 may also detect vehicle accelerations and decelerations.

Furthermore, a rotary transducer 17 or other sensor may be provided, the signals of which reveal if reel 4 of seat belt 1 is being rotated and/or whether seat belt 1 is being moved in the retraction or extraction direction.

The control circuit operates as follows:

First of all, it is assumed that sensor arrangement 16 is not signaling a dangerous condition. In addition, the occupant is assumed to have initially sat in a normal sitting position and buckled up. Control circuit 14 may ascertain this state from the signals of sensor 15 at the belt buckle, as well as sensor 17 at reel 4, and save it as the "normal" or "shortest possible" extraction length of the belt.

At this point, electric motor 10 is controlled so that retainer 11 of return spring 9 is adjusted and remains in accordance with a small spring tension of return spring 9. In this manner, only a small force is exerted on reel 4 in the pull-in direction of seat belt 1, and a retraction force of, for example, 2 N, is effective on seat belt 1.

If the occupant now bends forward with moderate speed, seat belt 1 is pulled out accordingly, return spring 9 being increasingly tensioned. However, because of the characteristic of restoring spring 9 designed as a spiral spring, this increase in tension is relatively small.

The aforesaid movement of the occupant, which is signaled by sensor 17, may cause control circuit 14 to drive motor 10 with low power, such that spring retainer 11 is adjusted in a direction increasing the spring tension of return spring 9. This may ensure that seat belt 1 effectively follows the occupant when he/she moves from the forward-leaning position temporarily assumed, back into his/her normal position for the normal or shortest possible extraction length of the belt.

Following a predefined time span after the last belt movement signaled by sensor 17, motor 10 may then adjust retainer 11 again so that the belt tension is once more returned to the very low value of, for example, 2 N.

Particularly great wear comfort may thereby be ensured as a result.

If, during the drive, sensor arrangement 16 signals a dangerous driving condition or one tending to be dangerous, e.g., a driving condition in which the brakes are applied strongly, then control circuit 14 switches motor 10 over to a high power range in the retraction direction of seat belt 1, i.e., its reel 4, whereby clutch 13, which is normally open, simultaneously closes. Seat belt 1 may therefore be retracted with great force, e.g., 150 N or more. This may ensure that seat belt 1 is disposed tautly against the body of the occupant, and in particular, a slack in the seat belt which may exist, i.e., caused by the occupant, may be retracted as quickly as possible to still achieve an effective belt tightening during the dangerous driving condition. Should a crash actually occur, it may therefore be ensured that the occupant falls into an effectively tightened seat belt 1.

When buckle latch 2 is released from the belt buckle, sensor 15 generates a corresponding signal. This may lead to control circuit 14 in turn driving motor 10 so that it adjusts spring retainer 11 along the lines of increasing the spring tension of return spring 9, in order to quickly and completely wind up seat belt 1 and subsequently retain it in its disused state.

Figure 2:
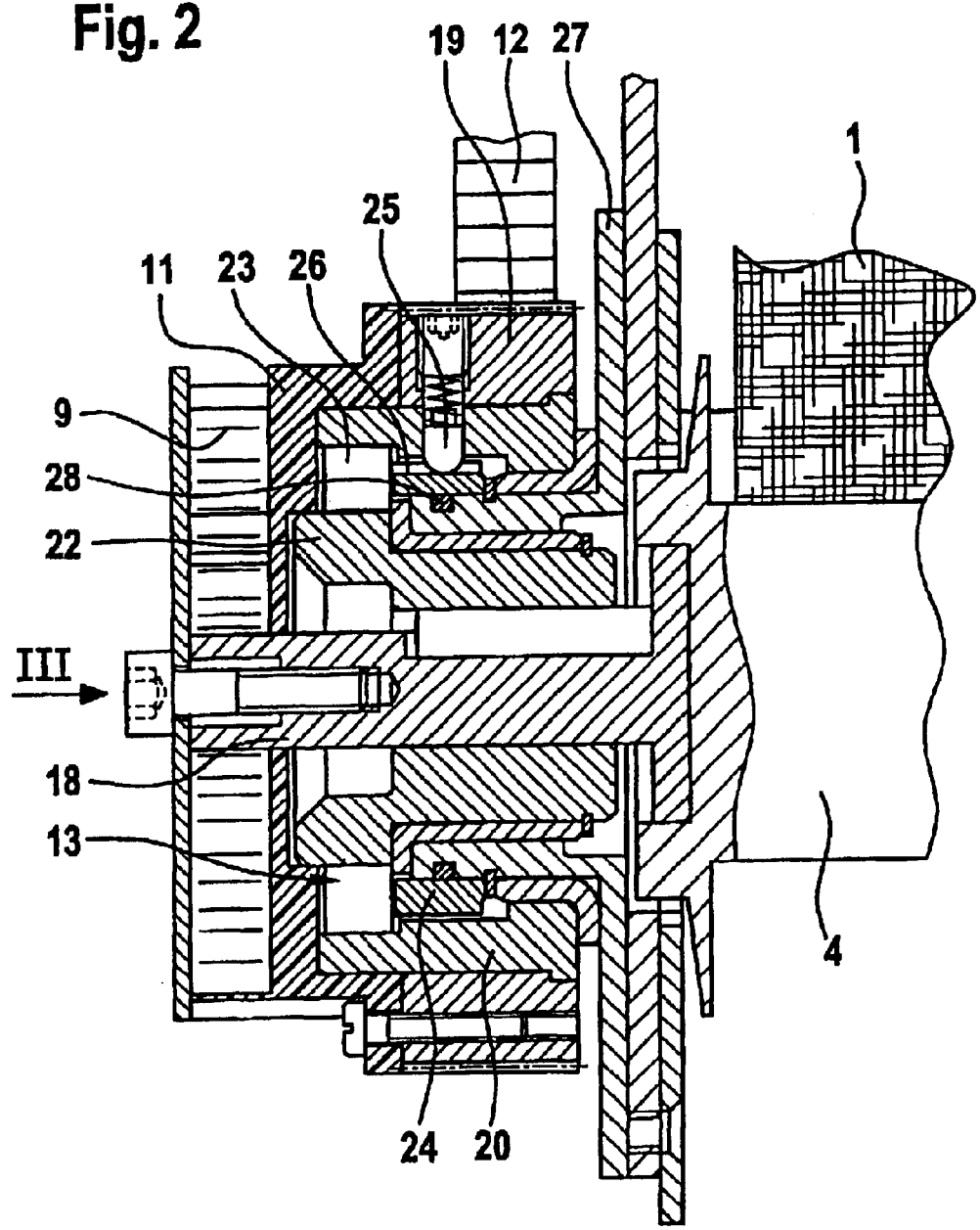
FIG. 2 is an axial cross-sectional view of the retraction device with return spring and clutch.
Figure 3:
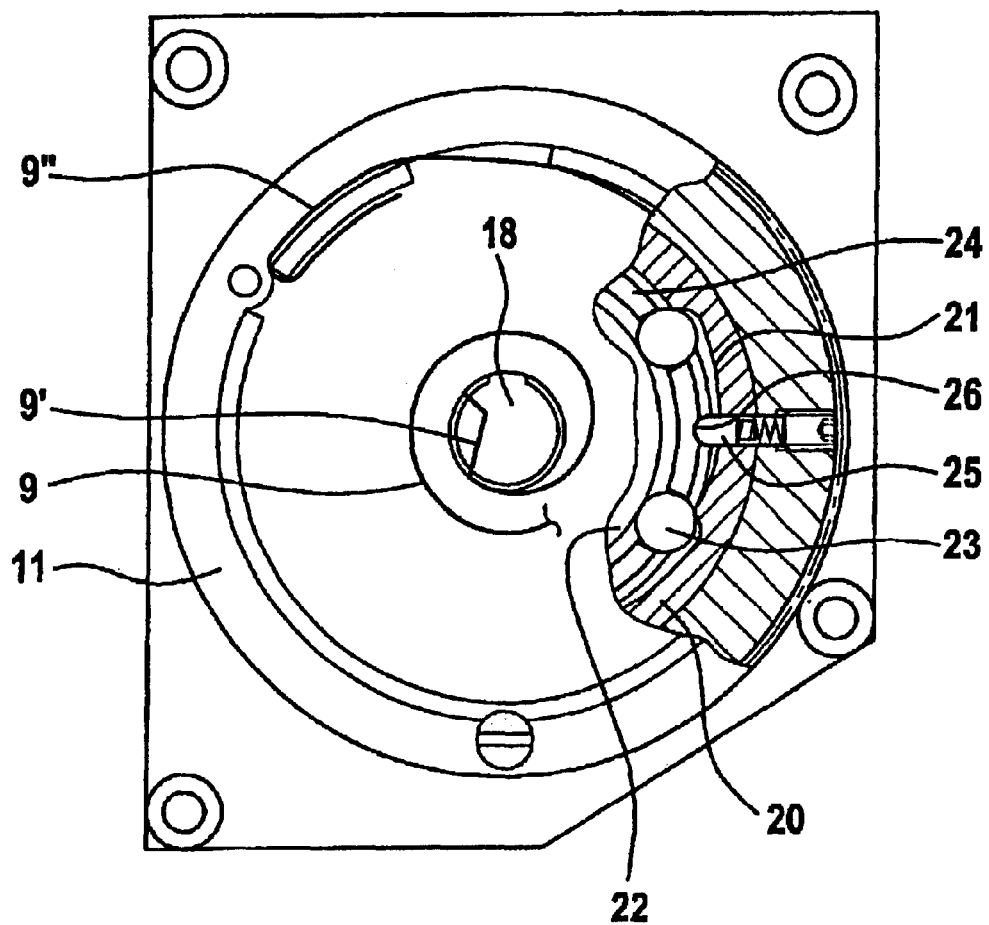
FIG. 3 a partial cut-off axial view of the retraction device corresponding to arrow III illustrated in FIG. 2.

FIGS. 2 and 3 illustrate an example embodiment of the construction of retraction device 8 having return spring 9 and clutch 13.

Reel 4, illustrated in FIG. 2 in cross-sectional view, is connected to radial inner end 9' of return spring 9, formed as a spiral spring, via a shaft 18. Outer end 9" of spiral-shaped return spring 9 is secured to hollow-wheel-type spring retainer 11, which on its part is screwed in a rotationally fixed manner to an annular toothed belt pulley 19 that cooperates with toothed belt 12, and accordingly is connected via toothed belt 12 to electric motor 10 in a manner allowing it to be driven.

Clutch 13, which in the example embodiment illustrated takes the form of a roller freewheel with latchable freewheel state, is disposed radially between shaft 18, and hollow-wheel-type retainer 11 and toothed belt pulley 19 joined axially thereto.

An outer ring 20 of the roller freewheel is connected in a rotationally fixed manner to hollow-wheel-type retainer 11 and toothed belt pulley 19. This outer ring 20 has ramp-like clamping surfaces 21, visible in FIG. 3, the function of which is further explained below. Inner ring 22 of the roller freewheel is coupled in a rotationally fixed manner to shaft 18 and reel 4.

Clamping rollers 23 are arranged radially between outer ring 20 and inner ring 22, and with the aid of an annular cage 24 are rotatably retained with distance from one another in the circumferential direction of cage 24.

Cage 24 is rotatable relative to outer ring 20 and inner ring 22, but is latched to outer ring 20. A flexible detent pin 25 is used for this purpose, which is disposed in a shiftable manner in mutually aligned radial bore holes of toothed belt pulley 19 and of outer ring 20, and is tensioned by a relatively weak locating spring against cage 24, so that detent pin 25 is able to interact in a latching manner with a catch slot 26 formed on cage 24.

In the latched state, clamping roller cage 24 has the position illustrated in FIG. 3, in which clamping rollers 23 have a radial play between the periphery of inner ring 22 and clamping surfaces 21 of outer ring 20. Consequently, outer ring 20 and inner ring 22 are decoupled from each other, i.e., the roller freewheel is in the freewheel state.

The strength of the latching of clamping roller cage 24 relative to outer ring 20 is calculated so that the latching, and therefore the freewheel state are maintained as long as outer ring 20 and toothed belt pulley 19, connected in a rotationally fixed manner to it, are accelerated only moderately. This may normally be ensured as long as electric motor 10 is operating in its low power stage.

When electric motor 10 is switched over to high power, and toothed belt pulley 19, as well as outer ring 20 which is rotatably fixed with respect to it as illustrated in FIG. 3, rotates anti-clockwise, high angular accelerations inevitably occur, with the result that clamping roller cage 24 is unlatched and rotates clockwise relative to outer ring 20. In this context, clamping rollers 23 cooperate with clamping surfaces 21 so that the radial play of clamping rollers 23 between outer ring 20 and inner ring 22 increasingly reduces, and clamping rollers 23 are ultimately locked between outer ring 20 and inner ring 22. Consequently, both rings 20 and 22 are coupled to each other, i.e., the roller freewheel is blocked. Accordingly, electric motor 10 is able to transmit to reel 4 a high torque, corresponding to its high power stage, for a reversible belt tensioning.

After the reversible belt tensioning has terminated, electric motor 10 rotates briefly in the reverse direction of rotation, so that the roller freewheel returns reliably to its latched freewheel state.

When this freewheel state exists, electric motor 10, in its low power stage, is able to adjust toothed belt pulley 19, and thus spring retainer 11, in the manner described above for setting the desired tension of return spring 9.

The return of the roller freewheel to its freewheel state is further facilitated by arranging a friction ring 28 between an annular region of clamping roller cage 24 and a stationary-held sleeve 27 that is co-axial to shaft 18, the friction ring coupling sleeve 27 and cage 24 so that they are frictionally engaged with a weak frictional connection, i.e., cage 24 may always rotate against a weak restraint which, however, is weaker than the latch resistance of detent pin 25 sunk into catch slot 26.

Deviating from the example embodiment illustrated in the drawing, in which clutch 13 is formed as a so-called gradient clutch which reacts to speed differentials between the clutch input and clutch output and inertia effects, and closes in response to greater speed differentials, a centrifugal clutch may also be provided which goes over to its closed state when motor 10 for the reversible belt tightening is operating with increased speed.

It is also possible to use a clutch 13 which operates as a function of the direction of rotation of motor 10. In this case, a force limitation may be provided, so that it may always be possible to pull out the belt contrary to the roll-up direction. This function may be necessary when unfastening the seat belt, to give the occupant the possibility of pulling out the belt when unbuckling. Optionally, the clutch may only engage when the motor torque exceeds or may exceed the torque of spring 9, and a relative rotation occurs between drive and reel.

What is claimed is:

1. A belt tensioner of a seat belt for an occupant on a seat in a vehicle, comprising:
   a motor switchable between two power ranges;
   an extraction lock configured to act in response to predetermined parameters;
   an irreversible tensioning device configured to produce an irreversible tightening of the belt with a strong force to force a desired sitting position of the occupant in response to a crash signal generated by a sensory system; and
   a retraction device configured to automatically shorten the belt including:
   (a) a return spring including a retainer remote from the belt and adjustable according to predetermined parameters by the motor; and
   (b) a normally open clutch arranged parallel to the return spring and configured to one of couple and connect the retainer to the retraction device to connect the retraction device to the motor for a reversible belt tightening in response to a dangerous driving condition, the clutch closable by the motor in accordance with the motor one of rotating in a direction of rotation corresponding to the reversible belt tightening and switching to high power.

2. The belt tensioner according to claim 1, wherein the vehicle includes a motor vehicle.

3. The belt tensioner according to claim 1, wherein extraction lock is configured to act in response to at least one of a predetermined acceleration of the vehicle, a predetermined acceleration of a body of the vehicle, a predetermined deceleration of the vehicle, a predetermined deceleration of the body of the vehicle and an exceeding of a predetermined extraction speed of the belt.

4. The belt tensioner according to claim 1, wherein the crash signal includes a signal configured to trigger an airbag.

5. The belt tensioner according to claim 1, wherein the force is approximately 4000 N.

6. The belt tensioner according to claim 1, wherein the motor is configured to automatically switch on a high power stage in response to an appearance of a danger signal.

7. The belt tensioner according to claim 1, wherein the motor is configured to set the return spring to a predefined increased tension by adjustment of the retainer when the belt is one of moved and pulled out.

8. The belt tensioner according to claim 1, the clutch includes at least one of a centrifugal clutch and a gradient clutch.

9. A belt tensioner of a seat belt for an occupant on a seat in a vehicle, comprising:
   a motor switchable between two power ranges;
   an extraction lock configured to act in response to predetermined parameters;
   an irreversible tensioning device configured to produce an irreversible tightening of the belt with a strong force to force a desired sitting position of the occupant in response to a crash signal generated by a sensory system; and
   a retraction device configured to automatically shorten the belt including:
   (a) a return spring including a retainer remote from the belt and adjustable according to predetermined parameters by the motor; and
   (b) a normally open clutch arranged parallel to the return spring and configured to one of couple and connect the retainer to the retraction device to connect the retraction device to the motor for a reversible belt tightening in response to a dangerous driving condition, the clutch closable by the motor in accordance with the motor one of rotating in a direction of rotation corresponding to the reversible belt tightening and switching to high power;
   wherein the motor is controllable in a low power range as a function of parameters and configured to set the return spring to a predefined minimal tension by adjustment of the spring retainer in accordance with an indication from signals of the sensory system that the occupant one of is sitting in a desired position and has not changed a sitting position for a predefined time span.

10. A belt tensioner of a seat belt for an occupant on a seat in a vehicle, comprising:
    a motor switchable between two power ranges;
    an extraction lock configured to act in response to predetermined parameters;
    an irreversible tensioning device configured to produce an irreversible tightening of the belt with a strong force to force a desired sitting position of the occupant in response to a crash signal generated by a sensory system; and
    a retraction device configured to automatically shorten the belt including:
    (a) a return spring including a retainer remote from the belt and adjustable according to predetermined parameters by the motor; and
    (b) a normally open clutch arranged parallel to the return spring and configured to one of couple and connect the retainer to the retraction device to connect the retraction device to the motor for a reversible belt tightening in response to a dangerous driving condition, the clutch closable by the motor in accordance with the motor one of rotating in a direction of rotation corresponding to the reversible belt tightening and switching to high power;
    wherein the clutch includes at least one of a centrifugal clutch and a gradient clutch; and
    wherein the clutch includes a roller freewheel having a latchable freewheel state arranged to unlatch in accordance with a switchover of the motor to high power and switchable into a clamping state.

11. The belt tensioner according to claim 10, wherein the roller freewheel includes a ring having clamping surfaces and a clamping roller cage latched relative to the ring.

12. The belt tensioner according to claim 11, wherein the clamping roller cage is configured to be rotatable with a weak restraint relative to a stationary part, the restraint weaker than a catch resistance of latching of the freewheel state.

\* \* \* \* \*